(12) United States Patent
Ferencz et al.

(10) Patent No.: US 10,031,011 B2
(45) Date of Patent: Jul. 24, 2018

(54) ULTRASONIC FLOW METER INCLUDING A SINGLE TRANSMITTING TRANSDUCER AND A PAIR OF RECEIVING TRANSDUCERS

(75) Inventors: György Ferencz, Budapest (HU); Zoltán Rozsnyik, Budapest (HU)

(73) Assignee: USCOM LIMITED, Sydney (AU)

( * ) Notice: Subject to any disclaimer, the term of this patent is extended or adjusted under 35 U.S.C. 154(b) by 446 days.

(21) Appl. No.: 12/531,105

(22) PCT Filed: Dec. 5, 2008

(86) PCT No.: PCT/HU2008/000146
§ 371 (c)(1),
(2), (4) Date: Sep. 14, 2009

(87) PCT Pub. No.: WO2009/071960
PCT Pub. Date: Jun. 11, 2009

(65) Prior Publication Data
US 2010/0095782 A1    Apr. 22, 2010

(30) Foreign Application Priority Data

Dec. 5, 2007    (HU) ..................................... 0700785

(51) Int. Cl.
*G01F 1/66*    (2006.01)
*G01F 15/14*    (2006.01)
*G01F 25/00*    (2006.01)

(52) U.S. Cl.
CPC ................ *G01F 1/667* (2013.01); *G01F 1/66* (2013.01); *G01F 1/662* (2013.01); *G01F 15/14* (2013.01); *G01F 25/0007* (2013.01)

(58) Field of Classification Search
None
See application file for complete search history.

(56) References Cited

U.S. PATENT DOCUMENTS 3,548,653 A * 12/1970 Corey ........................ 73/170.13
3,891,869 A    6/1975 Scarps
(Continued)

FOREIGN PATENT DOCUMENTS

CH    669 463 A5    3/1985
DE    103 28 662 A1    1/2004
(Continued)

*Primary Examiner* — Harshad R Patel
(74) *Attorney, Agent, or Firm* — Pearne & Gordon LLP

(57) ABSTRACT

A method of determining flow parameters of a streaming gas in a conduit for medical applications. Longitudinal waves are generated in a transmitter connected from outside to a conduit. These waves are transmitted along two diagonal paths through the streaming medium in an upstream and a downstream direction, and received by two receivers which are located in a diagonal upstream and downstream position and on an opposite side relative to the transmitter, also connected to the conduit. A transit time value of the waves between the transmitter and each of the receivers is determined. A difference value on the basis of the determined transit time values is generated and the flow parameters are determined on the basis of the difference value. This measuring method is highly independent of the propagation velocity of the wave in the medium streaming in the conduit therefore also independent of the temperature and humidity of a gaseous medium.

8 Claims, 12 Drawing Sheets

(56) References Cited

U.S. PATENT DOCUMENTS

| | | | |
|---|---|---|---|
| 3,987,673 A | | 10/1976 | Hansen |
| 4,015,470 A | | 4/1977 | Morrison |
| 4,616,510 A | | 10/1986 | Moore |
| 4,633,719 A | | 1/1987 | Vander Hayden |
| 4,860,593 A | * | 8/1989 | de Concini et al. ....... 73/861.29 |
| 5,090,252 A | * | 2/1992 | Tschirner .................... 73/861.28 |
| 5,275,060 A | * | 1/1994 | Lynnworth ................. 73/861.18 |
| 5,437,194 A | * | 8/1995 | Lynnworth ................. 73/861.27 |
| 6,026,693 A | * | 2/2000 | Baumoel et al. ........... 73/861.27 |
| 6,089,104 A | * | 7/2000 | Chang ......................... 73/861.27 |
| 6,293,156 B1 | * | 9/2001 | Shen et al. .................. 73/861.26 |
| 6,386,047 B2 | * | 5/2002 | Chang ......................... 73/861.29 |
| 6,526,838 B1 | * | 3/2003 | Froelich et al. ............. 73/861.28 |
| 2004/0030509 A1 | | 2/2004 | Ploug-Soerensen et al. |
| 2009/0100940 A1 | | 4/2009 | Strunz et al. |

FOREIGN PATENT DOCUMENTS

| | | |
|---|---|---|
| DE | 10 2004 060118 A1 | 6/2006 |
| DE | 10 2005 042792 B3 | 5/2007 |
| WO | 93/14382 A | 7/1993 |
| WO | 02/23136 A | 3/2002 |
| WO | 2006063931 A1 | 6/2006 |
| WO | 00/46575 A | 8/2008 |

\* cited by examiner

ULTRASONIC FLOW METER INCLUDING A SINGLE TRANSMITTING TRANSDUCER AND A PAIR OF RECEIVING TRANSDUCERS

TECHNICAL FIELD

The invention relates to a method for determining the flow parameters of a streaming medium in a conduit. Such flow parameters include for example flow rate or speed, volume or mass flow rate or other parameters. The invention also relates to an apparatus for performing the above method for determining the flow parameters of a streaming medium in a conduit. The streaming medium according to the invention may be any gas or fluid or a mixture of different gases or fluids. In a special application the streaming medium is air which can be defined as a mixture of gases also comprising a certain amount of fluid in a vaporized form.

BACKGROUND ART

There are different methods known in the art for determining the flow rate or other different flow parameters. One group of devices to accomplish this task comprise moving mechanical elements such as rotors or the like. Another group of devices comprises instead of the moving mechanical elements at least one pair of transducers acting as a transmitter and a receiver in order to generate, transmit and receive longitudinal waves inside the conduit along at least one transmission path. These devices accomplish different methods in order to determine the different flow parameters.

In a first group of methods the change of transit time is determined which is representative for the flow speed and direction. As disclosed in U.S. Pat. No. 4,015,470, selected variables of a fluid flowing through a conduit are measured by transmitting acoustic waves through the conduit wall and fluid stream along normal and oblique transmission paths between acoustic transducers located externally of the conduit, measuring the transit times of the waves between the transducers, and combining these transit times with certain conduit and transducer parameters according to predetermined mathematical relationships to obtain the values of the variables. The variables which may be measured are flow velocity, mass flow rate, sonic velocity of the fluid, fluid compressibility, fluid temperature, and fluid density. CH 669 463 suggests a method for measuring the flow rate, the volume flow rate, the temperature and the average molecular mass of gases or gas mixtures in a pipe on the basis of measuring the transit time with two transducers. The measured value of the transit time is dependent to a large extent on the speed of the acoustic waves and therefore on the medium properties such as temperature, pressure and others.

In a second group of methods the change of frequency is determined which is representative for the flow speed and direction. U.S. Pat. No. 3,987,673 discloses a flowmeter for measuring blood flow in a vascular channel by Doppler Techniques has an assembly of electro-ultrasonic transducers which direct ultrasonic radiation to a zone spaced from the assembly and receive radiation reflected therefrom. The transducers are spaced apart and capable of providing two radiation beam paths from transmitting to receiving transducers after reflection from the zone. The transducers are directed such that part of one of the beam paths forms an acute angle with the direction of blood flow and part of the other beam path forms an obtuse angle with the direction of blood flow. The reflected signals are shifted in frequency by Doppler effect and their instantaneous difference frequency is monitored and expressed directly in terms of velocity. Measuring only one frequency change has the same drawback as measuring a change of one transit time, it results in a dependency on sound velocity. However when measuring two frequency changes and determining the difference, this kind of measuring error can be eliminated. A further problem arises however when continuous waves are used, which cause unintended interferences of reflected waves and the forming of standing waves which deteriorate the overall result of measurement.

In a third group of methods the change of the phase of the transmitted wave is determined which corresponds to a change of transit time being representative for the flow speed and direction. An acoustic flow meter is known from U.S. Pat. No. 4,616,510 in which a plurality of different frequencies are transmitted in both upstream and downstream directions, and corresponding differences in transmission phase-delays due to such frequency changes detected and used to compute the fluid velocity by the formula $v_F = \pi L \ (1/M_D - 1/M_u)$ when L is the distance between transmitter and receiver, $M_D$ is the slope of the graph of phase delay vs. transmitted frequency for the upstream direction of transmission, and $M_u$ is the corresponding slope for the downstream direction. A signal processor using a least-squares algorithm is preferably employed to obtain best values for $M_D$ and $M_u$ from the several values of phase-delay difference produced by the several different transmitted frequencies. When using different frequencies, it might be difficult to avoid unintended interferences of the different transmitted and reflected waves which could result in non-systematic measuring errors.

U.S. Pat. No. 4,633,719 discloses a method and apparatus for generating a signal proportional to flow in a pipe using probes strapped onto the exterior of the pipe. Two ultrasonic wave packages at a carrier frequency are sent in opposite directions from one probe to the other. Two lower frequency signals are extracted from the two respective wave packages and analyzed to detect a phase difference. The phase difference corresponds to a difference in the travel times for the two wave packages caused by the flow velocity in the pipe. The two lower frequency signals are converted to digital data samples which are stored with reference timing data. A microelectronic processor synchronizes the two sampled waves, using the timing data, before comparing the sampled waves to determine the phase difference. The processor and associated circuitry also measure the travel times of the two ultrasonic wave packages and generate an output signal proportional to flow based on the measured phase difference and the measured travel times. The suggested arrangement comprises only one pair of transducers which are used as a transmitter and a receiver alternately. This arrangement does not allow a continuous measurement and a relatively large time interval has to be selected between two consequent measuring cycles due to the recovery time of the transducers. Due to this fact, this method and apparatus always will be imposed with a substantial systematic error.

Therefore it is an object of the invention to provide a method and apparatus for determining the flow parameters of a streaming medium in a conduit with a minimal or no dependency on the velocity of the acoustic waves in the medium and on the different medium parameters, such as temperature, pressure and others. A further object of the invention to provide a method and apparatus for determining the flow parameters of a streaming medium in a conduit with a high accuracy and resolution throughout the whole measuring process and no or a minimum of systematic and non systematic errors. It is also an object of the present invention to provide a method and apparatus for determining the flow parameters of gases, especially of air in a wide range of flow rate and with different streaming directions and other boundary conditions, such as gas composition, humidity, temperature, ect. In case of medical applications the conduit should be replaceable and sterilizable.

SUMMARY OF THE INVENTION

The invention is based on a method for determining the flow parameters of a streaming medium in a conduit in which longitudinal (acoustic) waves are generated inside a conduit with a transducer. The waves are transmitted in two different cross directions relative to the streaming direction (upstream and downstream direction) through the conduit and received with transducers. The flow parameters of the streaming medium are determined by processing the parameters of the received waves.

In one aspect of the invention, the longitudinal waves are generated in one of the transducers used only as a transmitter connected from outside to the conduit. These waves are transmitted along two diagonal paths through the streaming medium in an upstream and a downstream direction, and received by two transducers used only as receivers which are located in a diagonal upstream and downstream position and on an opposite side relative to the transducer used as a transmitter, also connected from outside to the conduit. A transit time value of the waves between the transducer used as a transmitter and each of the transducers used as receivers is determined. A difference value on the basis of the determined transit time values is generated and the flow parameters are determined on the basis of said difference value.

In cases when it is important to carry out the measurement substantially on the same volume unit of the streaming medium, a first transit time value of the waves between the transducer used as a transmitter and a first transducer used as a receiver in the upstream position is determined. On the basis of a difference of said transit time and a transit time corresponding to a zero flow rate, an approximate flow rate of the streaming medium is determined. In a next step a time shift value necessary for the streaming medium to propagate from a first wave transmission path to a second wave transmission path is determined. A second transit time value of the waves between the transducer used as a transmitter and a second transducer used as a receiver in the downstream position with a delay determined by said time shift value is also determined. A difference value on the basis of the determined first and second transit time values is generated and the flow parameters on the basis of said difference value is determined. This way the accuracy of the measurement may be further increased.

A flow rate value of the streaming medium can be determined on the basis of a difference value obtained from the reciprocal values of the transit times taken at the two transducers used as receivers. The flow rate value of the streaming medium in a low flow rate range may be corrected by a predetermined value selected on the basis of an analysis of a selected package of the received waves. A volumetric flow rate may be determined on the basis of the medium flow rate and the cross sectional area of the conduit.

Instead of continuous waves, it is advantageous to use wave packages separated from each other by a period sufficiently long for identifying the appropriate waves between the transmitter and the receivers.

In order to avoid the forming of standing waves it is preferred that subsequent pulse trains following each other are shifted in phase with respect to each other wherein the phase shift is selected randomly between a minimum and a maximum value.

In order to increase accuracy of the measurement, the transit time is determined for a wave package instead of a single wave. In an aspect of the invention this may be accomplished by measuring a transit time several times for subsequent waves and an average value of said several transit time values is generated. Another possibility to increase the accuracy of the measurement is an automatic calibration which may be performed after each change of a part of the apparatus, after each power up or before each measurement started by an operator.

The invention is also based on an apparatus for determining the flow parameters of a streaming medium in a conduit the apparatus comprising a transducer for generating longitudinal waves inside the conduit and for transmitting said longitudinal waves in two different cross directions relative to the streaming direction (upstream and downstream direction) through the conduit, a transducer for receiving said waves, and a control circuit for generating control signals and determining the flow parameters of the streaming medium by processing the parameters of the received waves.

In an aspect of the invention the apparatus comprises a transducer for generating longitudinal (acoustic) waves and for transmitting the waves along two diagonal transmission paths through the streaming medium in an upstream and a downstream direction which is configured as a transmitter and is connected from outside to the conduit. The apparatus also comprises two transducers for receiving the transmitted waves which are configured as receivers and are located in a diagonal upstream and downstream position and on an opposite side relative to the transducer configured as a transmitter, also connected from outside to the conduit. The apparatus further comprises means for determining a transit time value of the waves between the transducer configured as a transmitter and the transducers configured as receivers, means for generating a difference value on the basis of the determined transit time values, and means for determining the flow parameters on the basis of said difference value.

In another aspect of the invention, the apparatus comprises a transducer for generating longitudinal (acoustic) waves and for transmitting the waves along two diagonal transmission paths through the streaming medium in an upstream and a downstream direction which is configured as a transmitter and is connected from outside to the conduit. The apparatus also comprises two transducers for receiving the transmitted waves which are configured as receivers and are located in a diagonal upstream and downstream position and on an opposite side relative to the transducer configured as a transmitter, also connected from outside to the conduit. In cases when it is important to carry out the measurement substantially on the same volume unit of the streaming medium, the apparatus further comprises means for determining a first transit time value of the waves between the transducer configured as a transmitter and a first transducer configured as a receiver in the upstream position, means for determining an approximate flow rate of the streaming medium on the basis of a difference of said transit time and a transit time corresponding to a zero flow rate, means for determining a time shift value necessary for the streaming medium to propagate from a first wave transmission path to a second wave transmission path, means for determining a second transit time value of the waves between the transducer configured as a transmitter and a second transducer configured as a receiver in the downstream position with a delay determined by said time shift value, means for generating a difference value on the basis of the determined first and second transit time values, and means for determining the flow parameters on the basis of said difference value.

The transducer configured as a transmitter may be a wide angle radiator to irradiate the transducers configured as receivers or comprised of two narrow angle radiators (bifocal transmitter) each of them being directed to a transducer configured as a receiver.

The transducers (transmitter and receivers) are preferably piezoelectric devices for generating or receiving ultrasonic waves. The control circuit is configured to provide the necessary electric signals for the transducers preferably in the form of pulse trains separated from each other by a period sufficiently long for identifying the appropriate wave packages. The control circuit is further configured to process electric signals received from the receivers.

In a further embodiment the control circuit is configured to provide electrical control signals with subsequent pulse trains following each other shifted in phase with respect to each other, said phase shift being selected randomly between a minimum and a maximum value, for inhibiting the forming of standing waves inside the conduit.

In order to avoid transversal and shear waves propagating in the wall of the conduit, the wall of the conduit may be provided with wave propagation inhibiting elements in proximity of the transducers and/or the receivers.

For performing flow measurements by a person at any selected location, it is advantageous that the apparatus be configured as a handheld device. Such applications include industrial measurements on fluids or gases and medical measurements (blood or air flow).

When performing medical measurements, it is vital that the part of the apparatus being in contact with a human is removable or changeable and sterilizable. If the flow meter apparatus is used as a spirometer, the conduit has to be removable or changeable and sterilizable. In medical applications the apparatus and its housing is configured to receive, hold and release a sterile conduit.

The conduit may have a circular, angular, symmetrical, asymmetrical, flat or oblate cross sectional shape in the measuring area.

The transducer configured as a transmitter may be positioned substantially in the middle of the measuring area and two transducers configured as receivers may be positioned substantially in the edge region of the measuring area on the distant sides of the conduit.

When used as a spirometer, it may be advantageous that the conduit has a working position with the transducers being in a horizontal plane in order to avoid the disturbing effect of water or salival drops.

These and other objects and features of the present invention will become more apparent from the following detailed description of the preferred embodiments in connection with the drawings as set forth hereinafter.

DETAILED DESCRIPTION OF THE INVENTION

Figure 1:
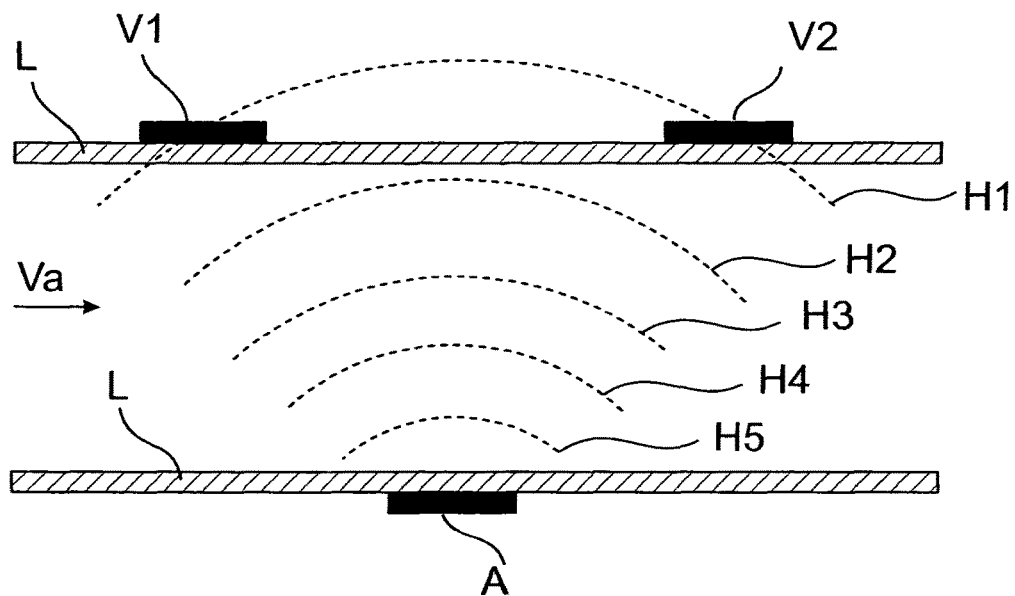
FIG. 1 is a cross sectional schematic view of an embodiment of the invention.

A first aspect of the invention can be understood best with reference to FIG. 1 showing a conduit L in cross section with a medium streaming with a flow rate $v_a$. The a conduit may be configured to have a circular or angular, symmetrical or asymmetrical, flat or oblate cross sectional shape at least in the measuring area. The cross sectional area should be generally constant along the longitudinal direction of the conduit but in some applications it may also be decreased in the measuring area in order to increase the flow speed and therefore increase the resolution and the accuracy of the measurement. The conduit is provided on the outer surface with a transducer configured as a transmitter A for generating the longitudinal waves and for transmitting the waves along two diagonal transmission paths through the streaming medium in an upstream and a downstream direction. On the outer surface of the conduit on an opposite side relative to the transducer configured as a transmitter there are two transducers configured as receivers V1 and V2 for receiving the waves transmitter by the transmitter A. The two receivers V1 and V2 are located in a diagonal upstream and downstream position relative to the transmitter A. The receivers V1 and V2 may be placed symmetrical or asymmetrical to the transmitter A. The transmitter A and the receivers may be accomplished as piezoelectric devices clamped on the outer surface of the conduit wall for generating and receiving ultrasonic waves. Transducers used as a transmitter or a receiver may have an identical or similar construction, however one of the transducers is configured to be used always as a transmitter and two other transducers are configured to be used always as receivers. In consequence, it is also possible to carry out a continuous measurement without any interruption necessary to change the direction of transmission as it is typical in prior art systems. A further advantage achieved by the invention is that the sensitivity of the transducers configured to be used always as receivers is much higher than that of the prior art systems where the transducers were used alternatively as a transmitter and a receiver. The transmitter A shown in FIG. 1 is a wide angle radiator and the receivers V1 and V2 are located within a range irradiated by the transmitter. In order to provide waves emitted from the piezo devices in phase so that the different waves do not interfere with each other resulting in a decrease of the amplitude, the piezo devices generally are provided with a wear plate of a thickness of $\lambda/4$. In order to maintain this wave emitting characteristic of the piezo devices, the overall thickness of such a wear plate and the wall of the conduit shall be preferably selected to be substantially $\lambda/4$. In one aspect of the invention this may be achieved by extenuating, removing or dimensioning the wear plate and selecting the wall thickness accordingly. In another aspect of the invention the wall thickness is selected to be thin and elastic enough to vibrate when the transducers are excited and oscillate. In order to minimize energy loss while transmitting said longitudinal waves through the conduit wall, the wall is preferably acoustical wave impedance coupled to the streaming medium.

V1 and V2 receivers are positioned so that they are irradiated by the transmitter. Transmitter A emits a longitudinal wave in the form of a pulse train, with pulses H1, H2, H3, H4, H5 and so forth. The longitudinal waves propagate semi-spherically towards the receivers in the order they were emitted and upon arrival they excite the receivers.

Figure 2:
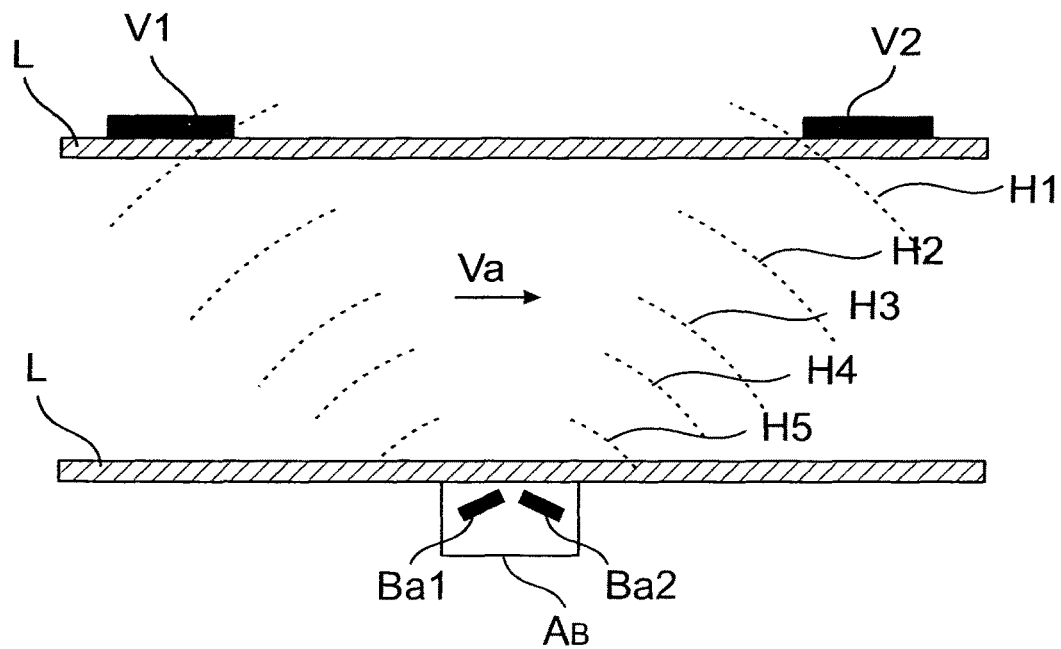
FIG. 2 is a cross sectional schematic view of another embodiment of the invention.

The transmitter shown in FIG. 1 has a wide radiation angle in order to irradiate both receivers. In order to provide for a sufficient level of excitation in the receivers, the transmitter has to transmit longitudinal waves with a relatively high power. In order to reduce the energy of the transmitted waves, the transmitter may comprise two narrow angle radiators (bifocal transmitter) each of them being directed to a receiver as shown in FIG. 2. This feature can be accomplished by incorporating two piezo transducers in one housing or by using a special bifocal piezoelectric transmitter $A_B$, in which one piezoelectric crystal is equipped with two focal couplings, thus providing virtually two transducers Ba1 and Ba2 in the same housing with one of the transducers Ba1 being directed towards the receiver V1 and the other transducer Ba2 being directed towards V2. Such a bifocal transmitter $A_B$ can communicate with two receivers V1 and V2 in a more efficient and physically synchronized way than the simple transmitter A or two different transducers because transmitter Ba1 can focus wave energy on receiver V1 and transmitter Ba2 can focus wave energy on receiver V2 while the transmitted waves are always in phase.

Figure 3:
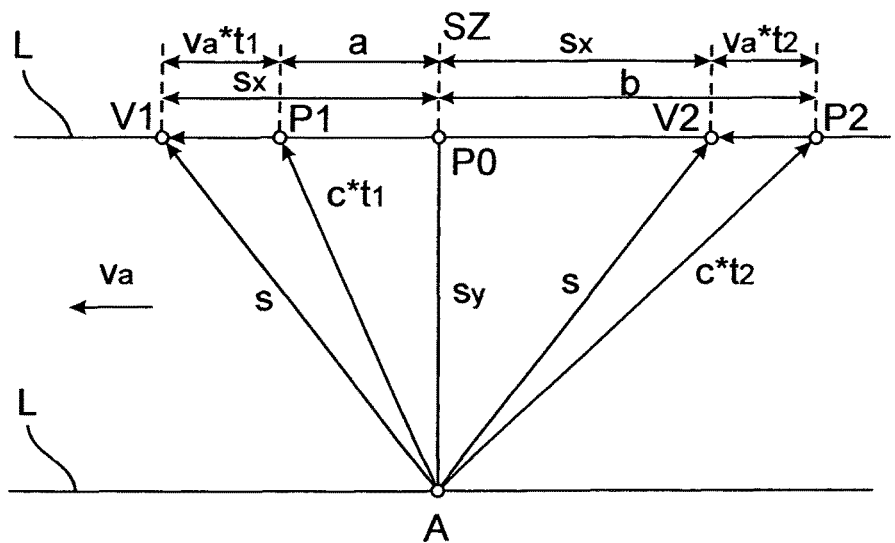
FIG. 3 is a vector diagram of the routes of the transmitted and received longitudinal waves and the distances between the transducers determined by the conduit.

FIG. 3 illustrates the geometrical arrangement of the transducers A, V1 and V2 shown if FIGS. 1 and 2, relative to the conduit L with all relevant distances. In this geometrical arrangement the receivers V1 an dV2 are positioned symmetrically in an upstream and downstream position relative to the transmitter A, therefore the distance s between the transmitter A and the receivers V1 and V2 or the distance $s_x$ between the receivers V1 and V2 and a point P0 on the symmetry axis SZ are identical. In consequence, the transit times t1 and t2 will also be equal to each other if the flow rate $v_a$ is zero. Therefore the difference of the two transit time values shall be zero (t2−t1=0). Due to imperfection of analog electrical components, unevenness of the wall of the conduit or other deficiency of the underlying electronics, a difference between the two transit time values will be detected in practice. Each time a difference of the transit time values is detected under zero flow condition in a symmetrical arrangement, an offset value is determined and all subsequent measured values will be corrected on the basis of the offset value. This may be used as an automatic calibration of the system before each start of measurement, after each power on or after each replacement of a part of the system.

If the flow rate is different from zero, it will influence the propagation of the waves from the transmitter A to the receivers V1 and V2 as shown in FIG. 3. A first part of the transmitted wave from transmitter A sent in direction P1 will arrive at receiver V1 and a second part of the transmitted wave from transmitter A sent in direction P2 will arrive at receiver V2. As it is clear from the drawing, the flow speed $v_a$ causes different transit times t1 and t2 at the receivers V1 and V2.

For the rectangular triangles in FIG. 3 the following equations can be set up.

$$s^2 = (a + v_a t_1)^2 + s_y^2 \quad (1)$$

$$s^2 = (b - v_a t_2)^2 + s_y^2 \quad (2)$$

$$(c \cdot t_1)^2 = a^2 + s_y^2 \quad (3)$$

$$(c \cdot t_2)^2 = b^2 + s_y^2 \quad (4)$$

The equal line segments can be written as equations:

$$a = s_x - v_a \cdot t_1 \quad (5)$$

$$b = s_x + v_a \cdot t_2 \quad (6)$$

These equations substituted in equations (3) and (4) yields $$(c \cdot t_1)^2 = (s_x - v_a \cdot t_1)^2 + s_y^2 \quad (7)$$

$$(c \cdot t_2)^2 = (s_x + v_a \cdot t_2)^2 + s_y^2 \quad (8)$$

From equations (7) and (8) $v_a$ can be obtained in the form:

$$v_a = \frac{(s_x^2 + s_y^2)(t_2^2 - t_1^2)}{2 s_x t_1 t_2 (t_1 + t_2)} = \frac{s^2 (t_2^2 - t_1^2)}{2 s_x t_1 t_2 (t_1 + t_2)} = \frac{s^2}{2 s_x} \left( \frac{1}{t_1} - \frac{1}{t_2} \right) \quad (9)$$

wherein
$v_a$ is the flow rate of the streaming medium,
$t_1$ is the transit time between transmitter A and receiver V1
$t_2$ is the transit time between transmitter A and receiver V2
$s_x$ is the distance between receiver V1 or V2 and P0
$s_y$ is the distance between transmitter A and P0
$s$ is the distance between transmitter A and receiver V1 or V2.

From equation (9) it can be seen that the flow rate can be determined on the basis of a difference value obtained from the reciprocal values of the transit times t1 and t2 taken at the two receivers V1 and V2. As the difference of the reciprocal values of the transit times t1 and t2 has to be multiplied only with a constant of the geometry of the system, it is clear that this measuring method is highly independent of the propagation velocity of the wave in the medium streaming in the conduit therefore also independent of the temperature and humidity of the medium. The volumetric flow rate of the streaming medium can be determined on the basis of the medium flow rate and the cross sectional area of the conduit at the measuring section.

Figure 6:
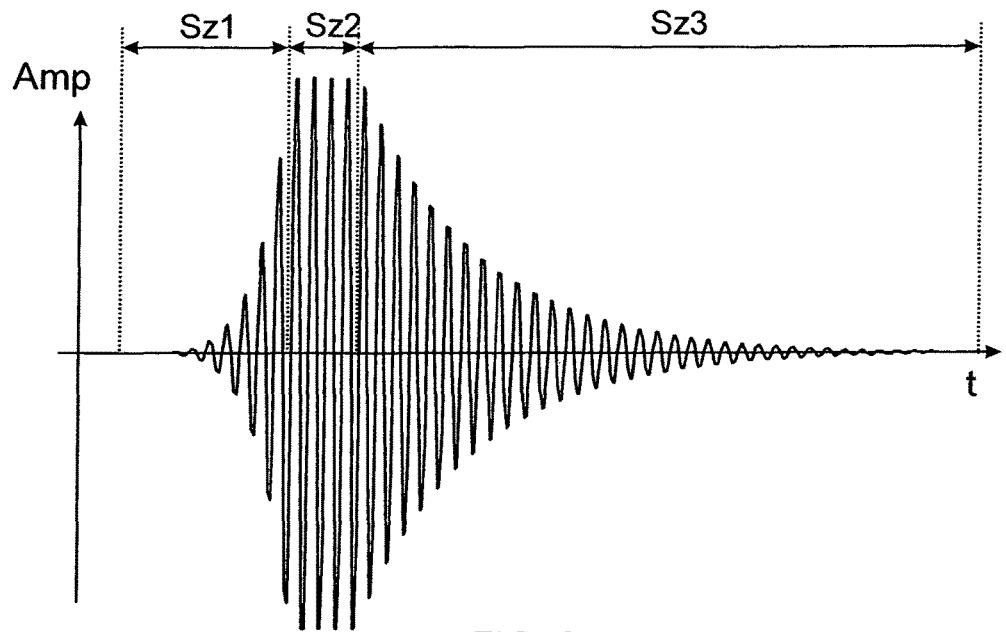
FIG. 6 is an enlarged view of an acoustic wave package received by a transducer.

If the flow rate value of the streaming medium is in a low flow rate range, it may be corrected by a predetermined value selected on the basis of an analysis of a selected package of the received waves. As it can be seen best in FIG. 6, a real acoustic or ultrasonic wave package received at receivers V1 or V2 has a special form that can be subdivided in three major sections. The first section Sz1 is characteristic for the piezo crystal when exited and can be identified as a starting, head or rising section. The second section Sz2 is characteristic for the piezo crystal stabilized resonance in the excited state and can be identified as a middle, body, constant or stable section. The third section Sz3 is characteristic for the piezo crystal after excitation by the received pulse train while still receiving reflected waves and can be identified as an ending, tail or falling section. Best suitable for measuring of the transit time is the middle section Sz2 with the best signal to noise ratio as it will be described in more detail later. The form of the third or tail section is largely dependent on the flow speed in a low flow speed range due to the multiple reflections, therefore it can be used to determine a corrected value of the flow rate and obtain a higher accuracy of the measurement in the low flow rate range. Characteristic signals or envelope forms of the tail section may be determined and stored for later use. Each of these forms may be assigned to a flow rate value or a correction value, which may be used in order to determine the corrected flow rate value in the low flow rate range. The characteristic envelope shapes are retained in memory, and when the measurement in Sz2 results a value below a selected threshold, the actually measured value is decided based on a shape comparison between the actual shape of the envelope and a series of saved envelope shapes.

Figure 4:
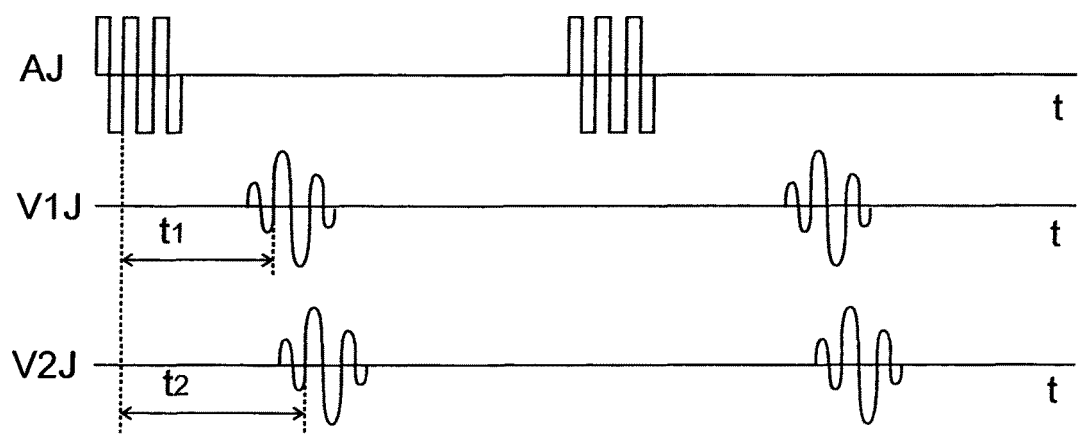
FIG. 4 is a diagram of the input signal of the transmitter and output signals of the receivers.

A control circuit—not shown in the drawing—provides electric signals for the transmitter and receives electric signals of the receivers. The control circuit comprises means for determining a transit time value of the waves between the transducer configured as a transmitter and the transducers configured as receivers, means for generating a difference value on the basis of the determined transit time values, and means for determining the flow parameters on the basis of said difference value. FIG. 4 illustrates a simplified time diagram of the transmitter and receiver signals. As it can be seen in the first diagram, the transducer configured to be used as a transmitter A of FIG. 1 is excited by an electric signal generated by a control circuit. The exciting signal has a square form and comprises pulse trains separated from each other by a period substantially long for identifying the appropriate pulse packages. Each of the pulse trains comprises 4 to 10 pulses and the wave packages are separated by a period of 40 to 400 pulse times. The frequency of the pulses is selected in the range of 40 kHz to 1 MHz. Upon excitation with the square wave electric signal transmitter A transmits ultrasonic wave packages to receivers V1 and V2 that are transformed into electrical signals shown in the second and third diagram. In a preferred embodiment, subsequent pulse trains following each other are shifted in phase with respect to each other wherein the phase shift is selected randomly between a minimum of 0 degree and a maximum of 360 degrees, for inhibiting the forming of standing waves inside the conduit.

As it is clear from FIG. 4, the transit time can be determined by measuring the time between a selected point of the exciting electric signal and a corresponding selected point of the output signal of a receiver. It is assumed that there is no substantial difference between the frequency of the exciting signal and of the transmitted ultrasonic signal or of the received ultrasonic wave and the output signal of the receiver.

The selected point of the received wave may be determined by comparing the received wave with a reference signal of a predetermined level being above the noise level. This reference level is above the noise level and below the peak amplitude of the wave signal. The reference level may be selected in a range of 10% to 90%, preferably in a range of 20% to 80%, or even more preferably in a range of 30% to 70% between the noise level and peak amplitude of the wave signal.

A better result of measuring the transit time may be achieved if the selected point of the received wave is determined as a zero crossing which may be determined and measured more precisely. In a preferred embodiment a first zero crossing will be used as a selected point for determining the transit time after the signal level exceeded the comparator level. It may also be preferable to measure the transit time between selected and corresponding zero crossings of the transmitted and received wave or signal. This selected zero crossing may be a zero crossing of a selected rising edge of the respective signal as it will be explained in more detail with reference to and in connection with FIG. 5.

Figure 5:
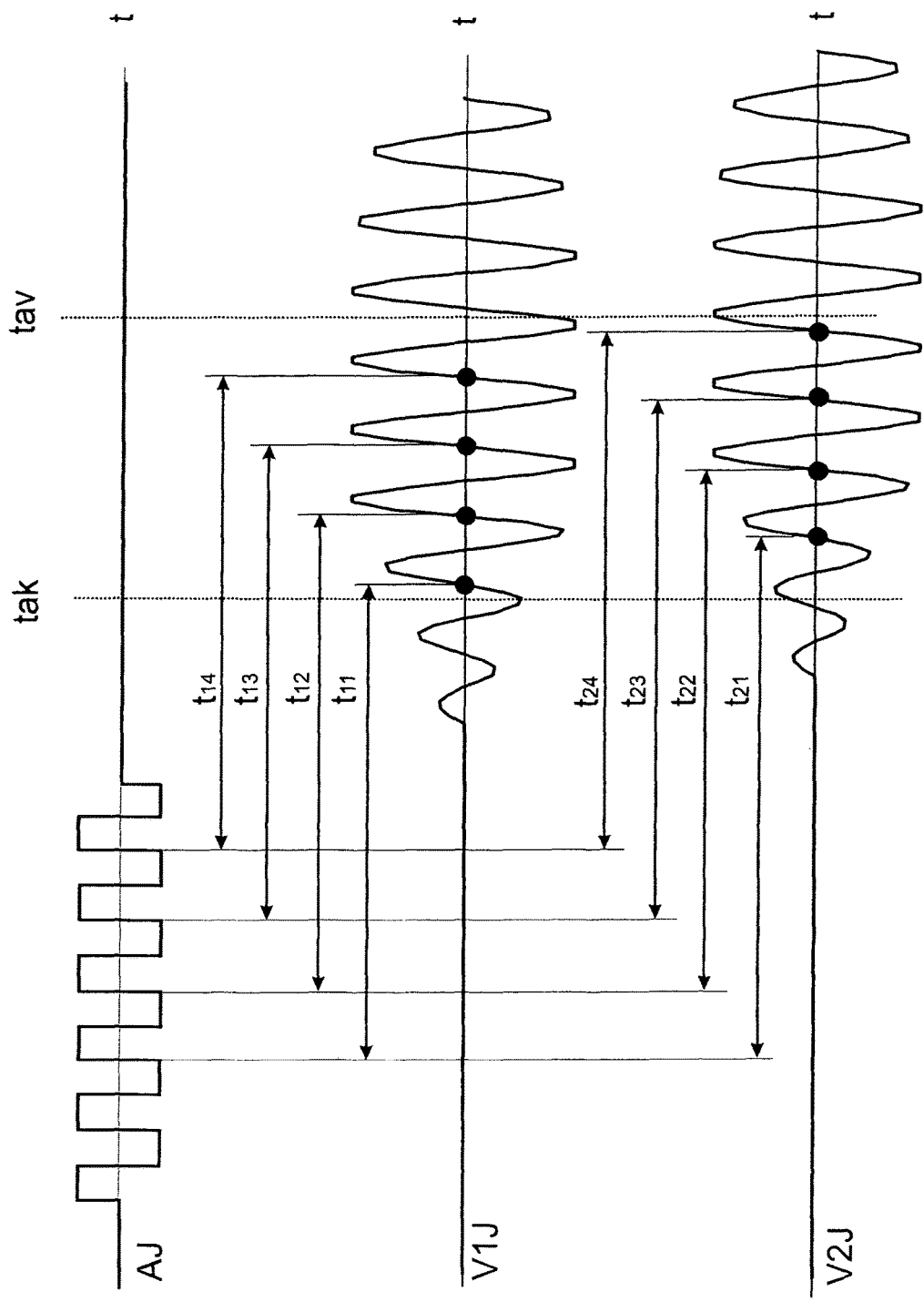
FIG. 5 is an enlarged view of the signals shown in FIG. 4 indicating also the transit times.

FIG. 5 illustrates a more realistic time diagram of the transmitter and receiver signals. Transmitter is excited with an electric signal AJ of six pulses in response of which transmitter broadcasts ultrasonic waves V1J and V2J of the same frequency but substantially of a sinusoidal form. The electric input signals of the transmitters are also referred to as a pulse train and the longitudinal waves generated by the transmitter as a wave package. Receivers receive the transmitted waves with a different delay after different transit times caused by the flow rate of the streaming medium. As it can be seen in FIG. 5, the first two waves have a relatively low amplitude one of them being under the noise level and the second already above the noise level. The disturbing noise is caused mainly by external vibrations, reflections and wave propagation in the wall. In order to eliminate the disturbing effect of the noise the receivers may be controlled to minimize their sensitivity in a time interval outside a time window for receiving the waves transmitted by the transmitter. The time window is defined between a starting time tak and an ending time tav. The time window may be selected by using a gating signal (not shown) having a rising edge at the beginning of the time window and a falling edge at the end of the time window. It is desirable to use a gating signal with a rising edge at a point of time when the transversal component of the wave propagating in the wall of the conduit or tube has possibly reached the receivers and with a falling edge at a point of time before significant reflected waves arrive at the receivers. In a symmetric arrangement of the shown example the same time window may be used for both receivers. In an asymmetric arrangement a different time window will be used for the two receivers. In the shown example the third wave is the first wave within this time window. Therefore the transit time will be determined between the zero crossing of the third pulse of the exciting signal and the corresponding zero crossing of the third wave of the received signal. These transit times are designated t11 and t21 in the drawing.

Due to a number of undesirable factors, such as single and multiple reflections, standing waves, and others, it is desirable to improve the measurement accuracy with statistical methods. In an aspect of the invention the transit time of the waves between the transmitter and the receivers is determined by measuring the transit time of subsequent waves or pulses and generating an average value of said several transit time values. This way a transit time of a complete wave package and not only of a single wave or pulse may be measured.

As shown in FIG. 5, the transit t1 and t2 time for both receivers V1 and V2 will be determined four times for four subsequent pulses or waves and the first two pulses are ignored. The transit time t1 will be calculated as an average of the measured values t11, t12, t13 and t14 and the transit time t2 will be calculated as an average of the measured values t21, t22, t23 and t24. An average value of the transit times representing a transit time for a wave package can be calculated on the basis of the following equation.

$$t_1 = \frac{\sum_{i=0}^{N-1} t_{1i}}{N} \text{ and } t_2 = \frac{\sum_{i=0}^{N-1} t_{2i}}{N} \qquad (10)$$

where N is the number of measured transit times (in the shown example N=4). Alternatively this average may also be a weighted average with more emphasize on the first pulses and less weight on the last pulses which already may be influenced by reflections.

Figure 7:
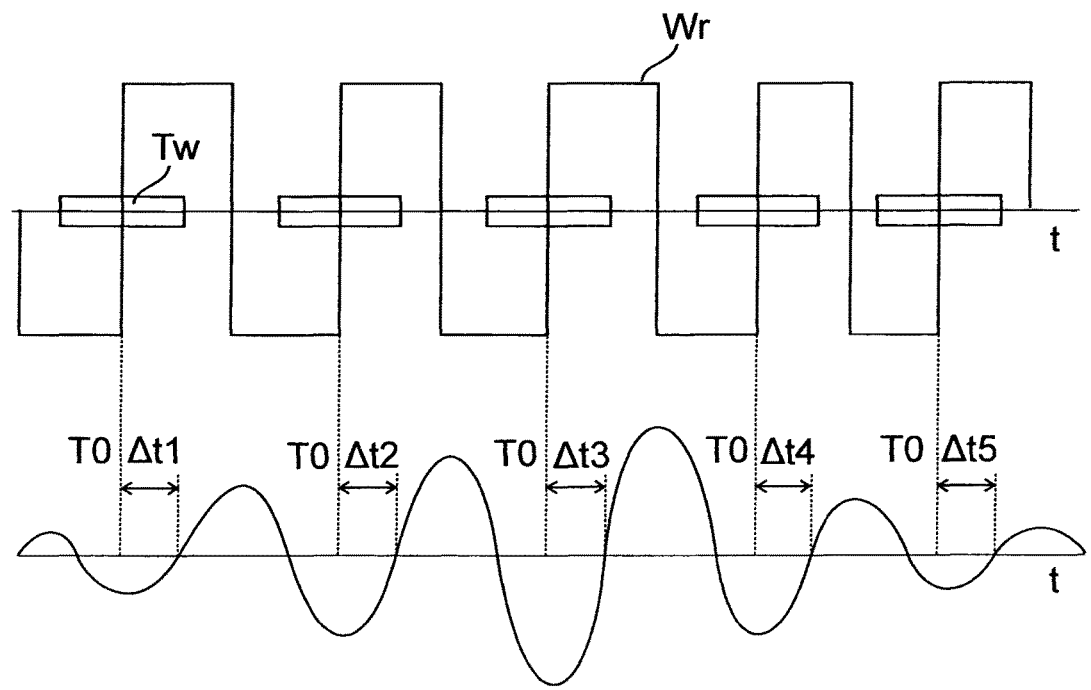
FIG. 7 is a diagram showing an embodiment for measuring the transit time values.

According to a further aspect of the invention, a time window Tw may be determined for each pulse or wave within the wave package. The middle of this time window is defined by the transit time T0 between the transmitter and the receiver under normal conditions when the flow rate is zero. This way each received pulse or wave will fall within one of these individual time windows Tw on the basis of which it will be easy to select waves of a wave package for measuring transit time components. As shown in FIG. 7, the individual time windows are around the rising edges of a reference square wave signal, which has the same frequency as the electric signal used for exciting the transmitter. Each zero crossing of a rising edge of this reference square signal defines the transit time T0 of a pulse under zero flow conditions. This way it is very easy to determine a transit time as a sum of T0 and a time shift of the zero crossing of a rising edge of the received wave within the individual time window. In other words t11=T0+Δt1. The next transit time components may be determined in a similar way. t12=T0+Δt2, t13=T0+Δt3, t14=T0+Δt4 and t15=T0+Δt5. In order to provide a statistically more reliable measuring result, the transit time may be determined as an average of these transit time components as already disclosed above.

Figure 8A:
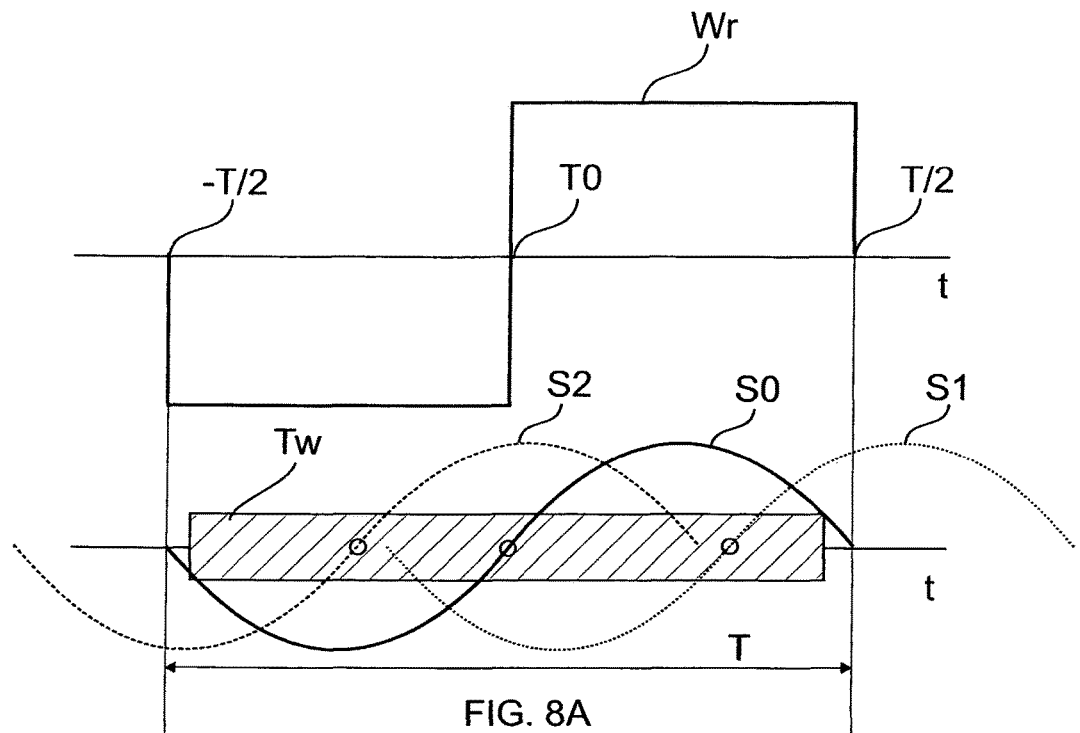
FIG. 8A, 8B are diagrams showing the correlation between the flow rate and the phase shift or transit time difference relative to the zero flow rate value.
Figure 8B:
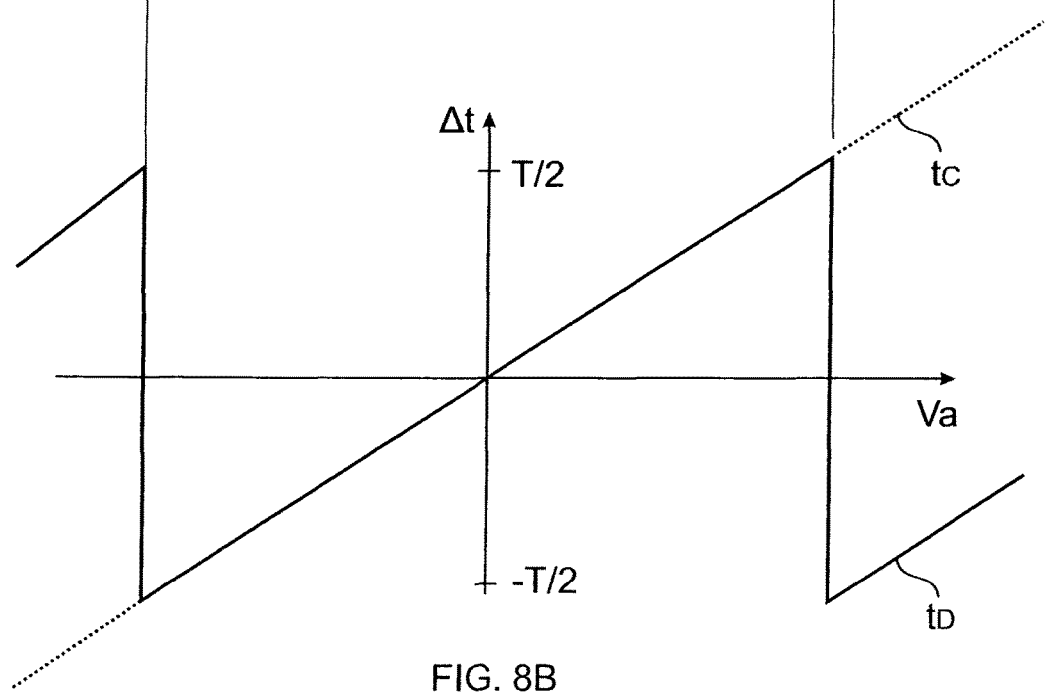

In order to do so, it is important to select the frequency of the transmitter, the transmitter-receiver distance and the volume flow velocity range properly. Is the frequency or the flow speed too high, or the distance too short, the time shift may be above the time window, which is limited by the full period of a wave as shown in FIG. 8A. The time window Tw shown in FIG. 8A is smaller than the theoretical maximal value which is equal to T, the full period of the reference wave Wr shown in the first diagram. The second diagram shows different received waves S0, S1 and S2. The received wave S0 is characteristic for a zero flow rate condition with no time or phase shift relative to the reference wave (Δt=0). The received waves S1 and S2 are characteristic for a flow rate of different streaming direction, therefore the time shift values Δt1 and Δt2 have different signs. FIG. 8B shows the dependency between the flow rate $v_a$ and the time shift value Δt. As it can be seen, if the flow rate under given circumstances is within a maximal and a minimal value, that is $v_{amim} < v_a < v_{amax}$, the time shift value will also be within a range defined by the period T of the reference wave, that is Δt <+−T/2. As long as the time or phase shift value is within the time window, the determined zero crossing of the received wave can be unambiguously assigned to a wave number and the transit time can be determined exactly as described above in connection with FIG. 7. If however the flow rate of the streaming medium under given circumstances exceeds a maximal value $v_{amax}$, the zero crossing will shift to a neighboring period of the reference wave and a phase jump will be detected as shown in FIG. 8B. In that moment the time shift value changes from +T/2 to −T/2 as shown on the right side or from −T/2 to +T/2 as shown on the left side of the diagram. The determined time shift value $t_D$ after such a phase or time jump is not accurate and needs to be modified in order to provide a corrected time shift value $t_C$ as shown with the dotted line. The correction means provides for the addition or subtraction of the value T so that a correct time shift value is obtained even under extreme streaming conditions. As the flow rate can only change continuously, a jump in the determined time or phase shift value can be interpreted as exceeding the maximum or minimum of the time window (T0+−T/2) and can be compensated accordingly by adding or subtracting the time of a period T. After one or more jump in the measured time shift value the system has to recognize the return change in direction to a zero flow rate and carry out the return steps of compensation accordingly.

In order to obtain accurate measurement values with an electronic flow measurement system, it has to be calibrated with an external or internal calibration. External calibration can be carried out once at the place of manufacture or cyclically at a calibration site in a prescribed period. As external calibration is time consuming and can not be carried out at any time or place, it is advisable to perform internal calibration of the apparatus automatically each time before a measurement is started or each time the apparatus is switched on or a part of the instrument has been exchanged. One method for internal calibration has already been described in connection with FIG. 3 for a symmetrical arrangement of the transducers.

Figure 9:
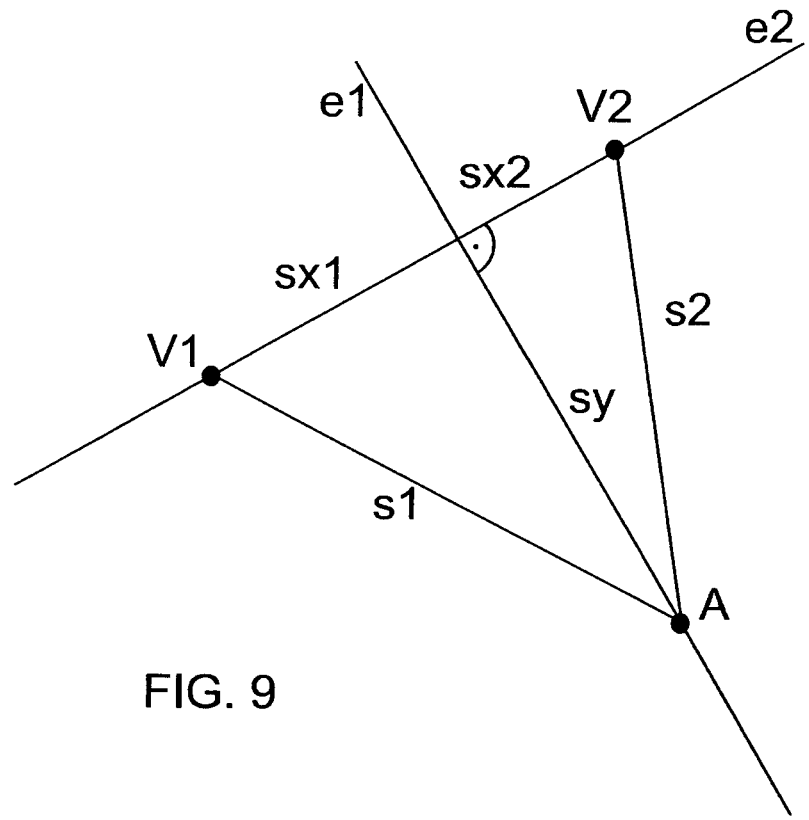
FIG. 9 is a diagram showing the values used for an automatic calibration.

In case the receivers are positioned asymmetrically relative to the transmitter and a change of the distance between the transmitter and the receivers is detected, a correction value will be determined and all subsequent measured values of the transit time will be modified on the basis of the correction value. This kind of calibration may be used with the embodiments of the apparatus shown in FIGS. 13 and 14. This calibration method can be explained best with reference to FIG. 9, wherein transmitter A and receivers V1, V2 define a triangle. The distance sy between the transducer A and the line e2 connecting the receivers V1 and V2 can be measured on line e1. The distance between the receivers V1 and V2 on line e2 is subdivided by line e1 into sx1 and sx2. It is assumed that the distances sx1 and sx2 are constant and the distance sy can change, therefore sy has to be determined under zero flow condition. In case of zero flow measurement (va=0) the following equations are valid for $t_1$ and $t_2$:

$$s_1 = c * t_1$$

$$s_2 = c * t_2 \qquad (11)$$

wherein s1 is the distance between transmitter A and receiver V1 s2 is the distance between transmitter A and receiver V2

C is the speed of sound t1 is the transit time measured at the receiver V1 t2 is the transit time measured at the receiver V2.

After transformation we get the following equation for $s_y$:

$$s_y = \sqrt{\frac{s_{x1}^2 - \frac{t_1}{t_2}s_{x2}^2}{\frac{t_1}{t_2} - 1}} \quad (12)$$

Equation 12 shows that the unknown distance $s_y$ can be determined in case of zero flow with a simple measurement. That is, if the receivers are positioned asymmetrical to the transmitter, and the apparatus can be opened and closed, thus the transmitter can be detached from its original location and later restored with certain positioning errors, then the errors resulting from the positioning inaccuracy can be easily compensated with a simple measurement under zero flow condition.

As it is apparent for those skilled in the art, the flow speed can be determined in case of an asymmetric placement of the receivers relative to the transmitter, and the result of the flow measurement is still independent of the velocity of the longitudinal waves in the medium, thus independent of temperature, humidity and the like.

The flow speed in case of asymmetric arrangement can be calculated as:

$$v_a = \frac{1}{2} * \frac{s_{x1}^2 t_2^2 - s_{x2}^2 t_1^2 + s_y^2(t_2^2 - t_1^2)}{s_{x1} t_1 t_2^2 + s_{x2} t_2 t_1^2} \quad (13)$$

In certain applications the ambient parameters of the measured media may change dynamically with the volume flow. If the physical parameters of the media change, a change of speed of the longitudinal wave in the medium can also be detected. In such a case it is important to carry out the measurement on the same volume in both transmission paths in order to increase accuracy of the measurement.

Figure 10:
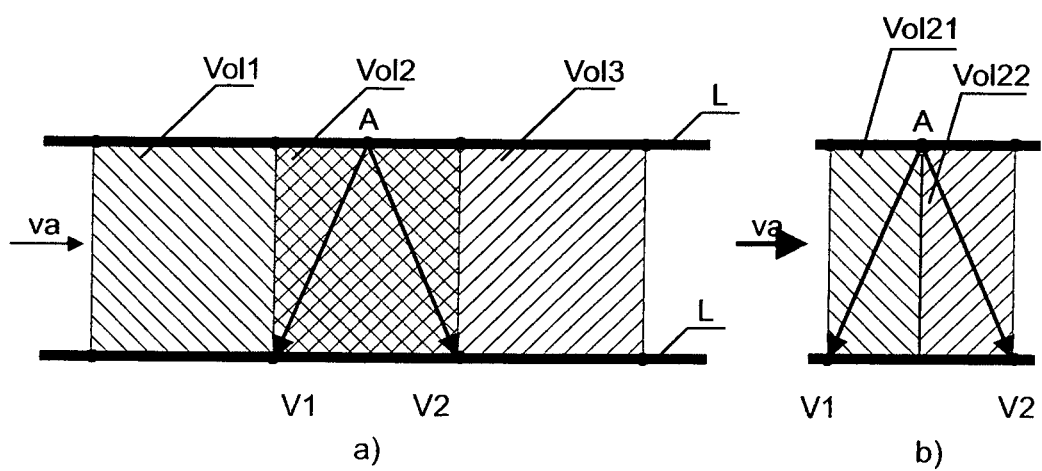
FIG. 10 is a cross sectional schematic view of an embodiment of the invention for measuring the same volume unit in the two wave paths.

The method according to this aspect of the invention comprises the step of determining the flow direction and a preliminary or estimated flow rate on the basis of at least one transit time measurement. For this purpose it is enough to determine only one transit time but the measurement of two transit times and using the equation (13) will provide a more accurate result. On the basis of the calculated preliminary value of flow speed, a time shift value necessary for the streaming medium to propagate from a first wave transmission path to a second wave transmission path will be determined. For this purpose it is assumed that the volume measured will be shifted by a half of the distance between the two receivers V1 and V2 as shown in FIG. 10. The general method for determining the flow parameters of a streaming medium will be modified according to this aspect of the invention only to the extent, that the measurement of the transit time t1 and t2 in the two transmission paths will be shifted in time with a delay determined by said time shift value.

An example of application the measurement of human breathing may be mentioned, where the inhaled air has room temperature and minimal humidity while the exhaled air is heated up close to the temperature of the human body and humidity is also significantly increased. In case the physical conditions of the measured medium change dynamically, the general method may be extended with an additional technique that provides even more precise results.

Referring again to FIG. 10, one can see three non overlapping volume sections Vol1, Vol2 and Vol3 of the same size. The flow meter always measures the medium in volume section Vol2 due to the fact that transmitter A and the two receivers V1 and V2 are located in the range of this volume section. If the volume flow in the conduit has the direction as velocity vector $v_a$ shows, the medium of volume section Vol1 is in a pre measuring position and the medium of volume section Vol3 is in a post measuring position.

By way of an example the modified method can be carried out alternatively as follows:

Step 1. Determining the direction and estimating the velocity of the volume flow $v_a$ using both A–V1 and A–V2 measurements. The resulting values are transit times $t_{11}$ and $t_{21}$ and estimated velocity $v_{ae}$.

Step 2A. If direction of the flow rate $v_a$ is identical with the one displayed in FIG. 10, a second measurement is carried out after a pre-calculated time that is needed for the medium to proceed from volume Vol21 to volume Vol22. In a symmetrical arrangement Vol21 and Vol22 are equal and are obtained by division of Vol2. This way transit time values $t_{11}$ and $t_{22}$ are obtained. Finally $v_a$ is calculated by using equation (9) where $t_1 = t_{11}$ and $t_2 = t_{22}$.

Step 2B. If direction of $v_a$ is the opposite as shown in the drawing, a second measurement is carried out after a pre-calculated time that is needed for the air to proceed from volume Vol22 to volume Vol21. In a symmetrical arrangement Vol21 and Vol22 are equal and are obtained by division of Vol2. This way transit time values $t_{12}$ and $t_{21}$ are obtained. Finally $v_a$ is calculated by using equation (9) where $t_1 = t_{12}$ and $t_2 = t_{21}$.

Figure 11:
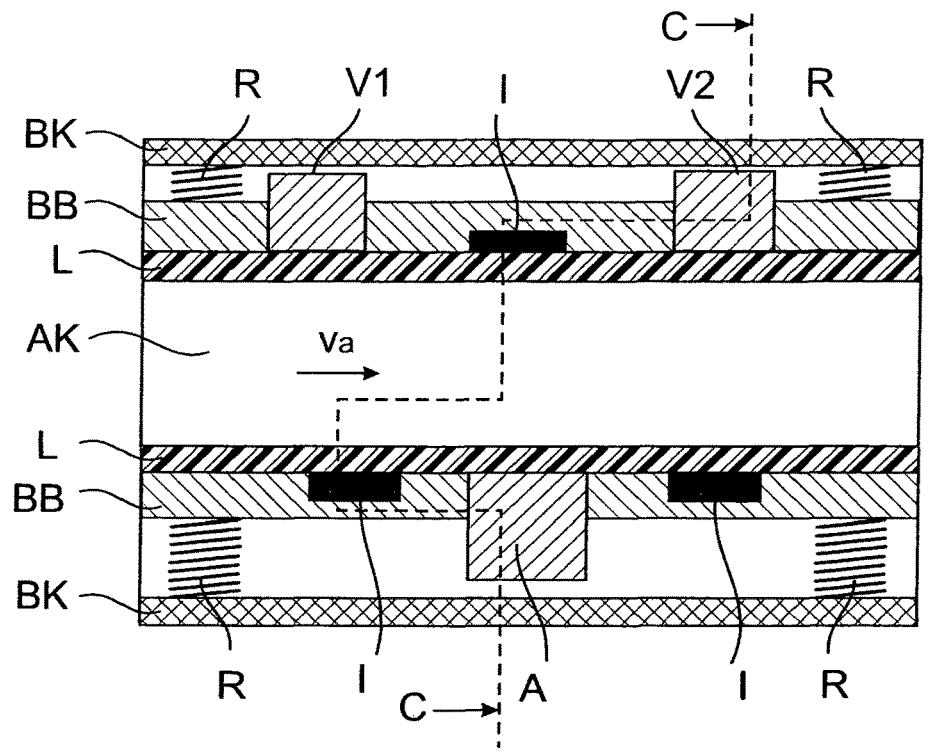
FIG. 11 is a cross sectional view of an apparatus comprising fixing and holding elements between the housing and the conduit, taken along the longitudinal axis of the conduit.
Figure 12:
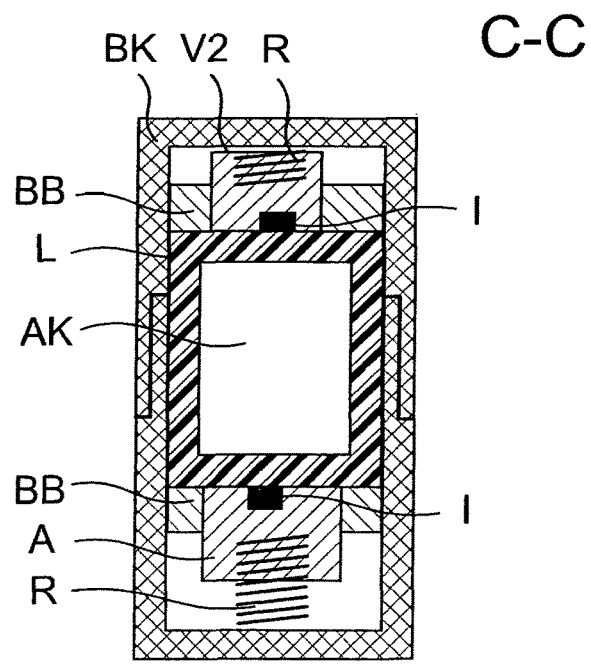
FIG. 12 is a cross sectional view of an apparatus shown in FIG. 11, taken along line C-C of the conduit.

Three different mechanical arrangements of the apparatus of the invention are shown in FIGS. 11 to 16 and 18. FIGS. 11 and 12 illustrate an exemplary embodiment with a housing of two parts connected to each other with a push and snap connection in cross section. In this example the conduit L has a rectangular cross section with a larger and a smaller cross sectional direction. The active elements, comprising a transducer configured to be used as a transmitter A and two transducers configured to be used as receivers V1 and V2, are received in and held by internal covers BB that can be positioned on the smaller outer walls of the conduit in order to provide a larger distance between the transmitter A and the receivers V1, V2. The internal covers BB are held in connection with and pressed to the outer wall of the conduit by external covers BK and at least one spring R on each side between the outer and the inner covers BK and BB. Adjusting pins I may be used to establish a predefined geometrical relation between the outer and the inner covers. The flow rate $v_a$ of the streaming medium AK is indicated by an arrow. Closing and opening of the two parts of the housing is easy with the push and snap connection, which is especially important in medical applications where the conduit has to be removed for sterilization or exchanged in a quick and easy manner. FIG. 12. is a cross sectional view of the apparatus as shown in FIG. 11, taken along line C. External cover BK can be opened along the perpendicular axis of the L flow conduit or otherwise, the conduit L can be replaced and sterilized easily. When closed, the conduit L fits perfectly in the internal cover BB. The transmitter A and the receivers are V1,V2 positioned with precision and in strong contact with the conduit L.

Figure 13:
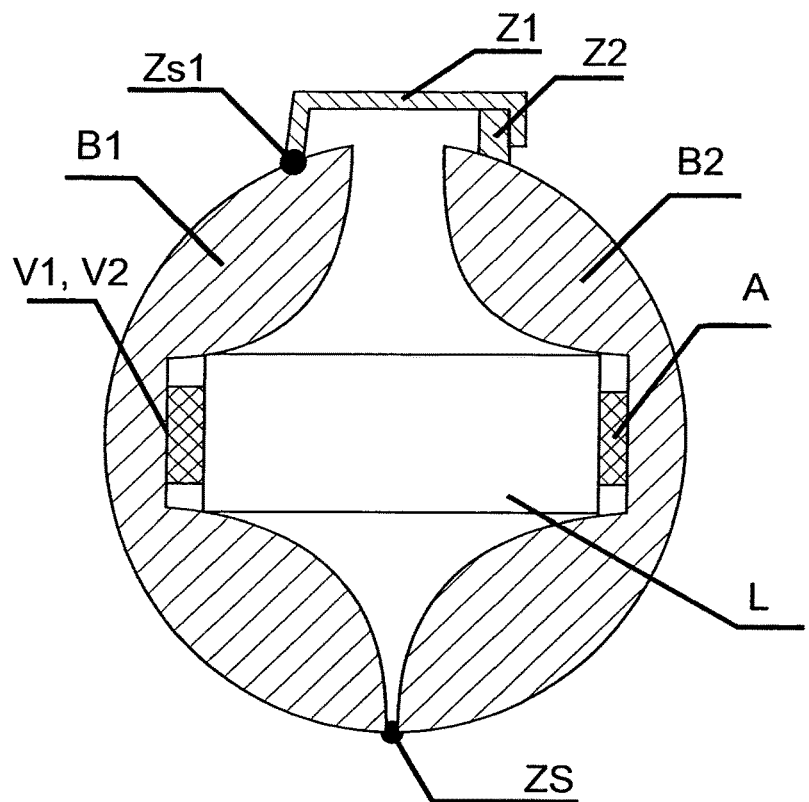
FIG. 13 is a cross sectional view of an apparatus comprising a housing with two parts enclosing conduit and being hinged to each other, in a closed position.
Figure 14:
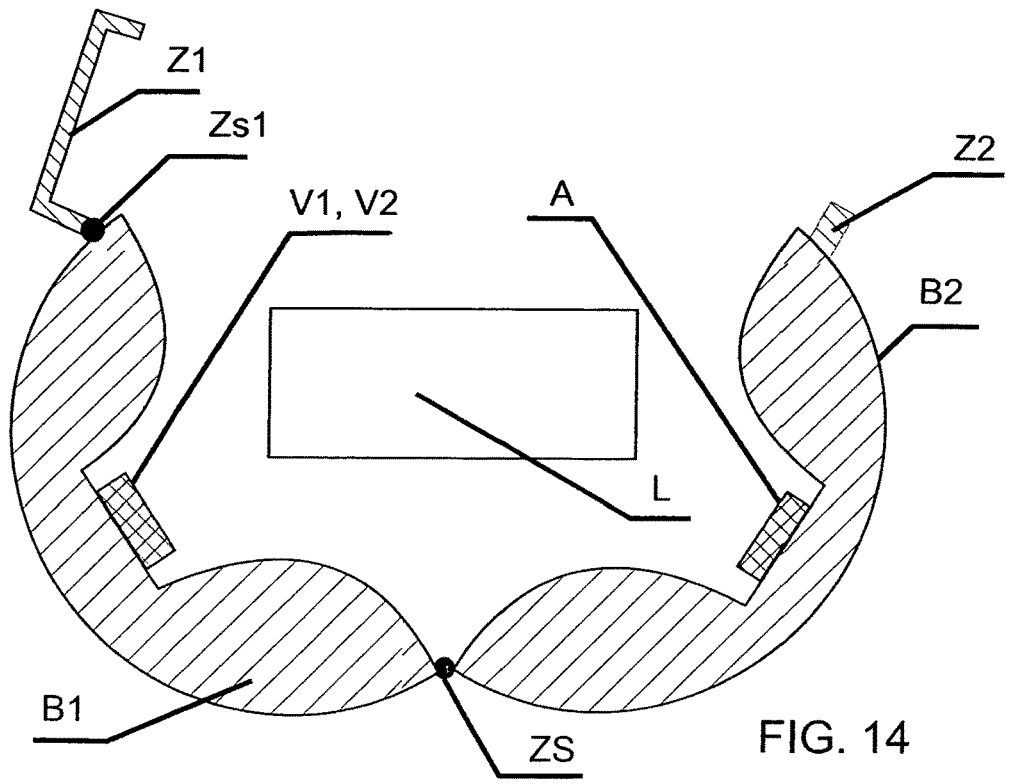
FIG. 14 is a cross sectional view of an apparatus shown in FIG. 13, in an open position.

FIGS. 13 and 14 illustrate an exemplary embodiment with a housing of two parts connected with an articulated hinged connection to each other in cross section. In this example the conduit L has a rectangular cross section with a larger and a smaller cross sectional direction. The active elements, comprising a transducer configured to be used as a transmitter A and two transducers configured to be used as receivers V1 and V2, are received in and held by a recess in the two parts of the housing B1, B2 connected to each other by a hinge ZS. In a closed position of the housing (FIG. 13) the active elements are in contact with the smaller outer walls of the conduit in order to provide a larger distance between the transmitter A and the receivers V1, V2. The two parts B1, B1 of the housing are held in a closed position by a latch Z1 pivotable around a joint axis Zs1 and connectable with pin Z2. Closing and opening of the two parts of the housing is simple with the latch and pin connection, which is especially important in medical applications where the conduit has to be removed for sterilization or exchanged in a quick and easy manner. The active elements may also be connected permanently to the conduit. In that case they will be sterilized together with the conduit if required.

Figure 16:
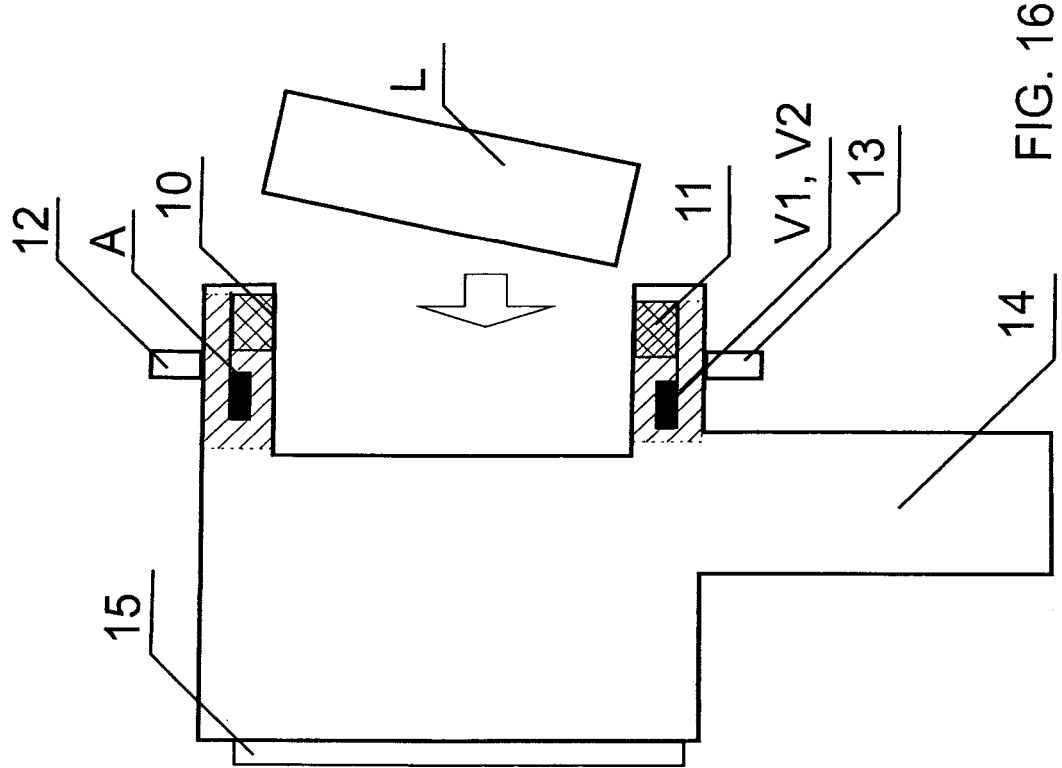
FIG. 16 is a side view of an apparatus comprising a housing with releasable fixing elements and a conduit before insertion.
Figure 15:
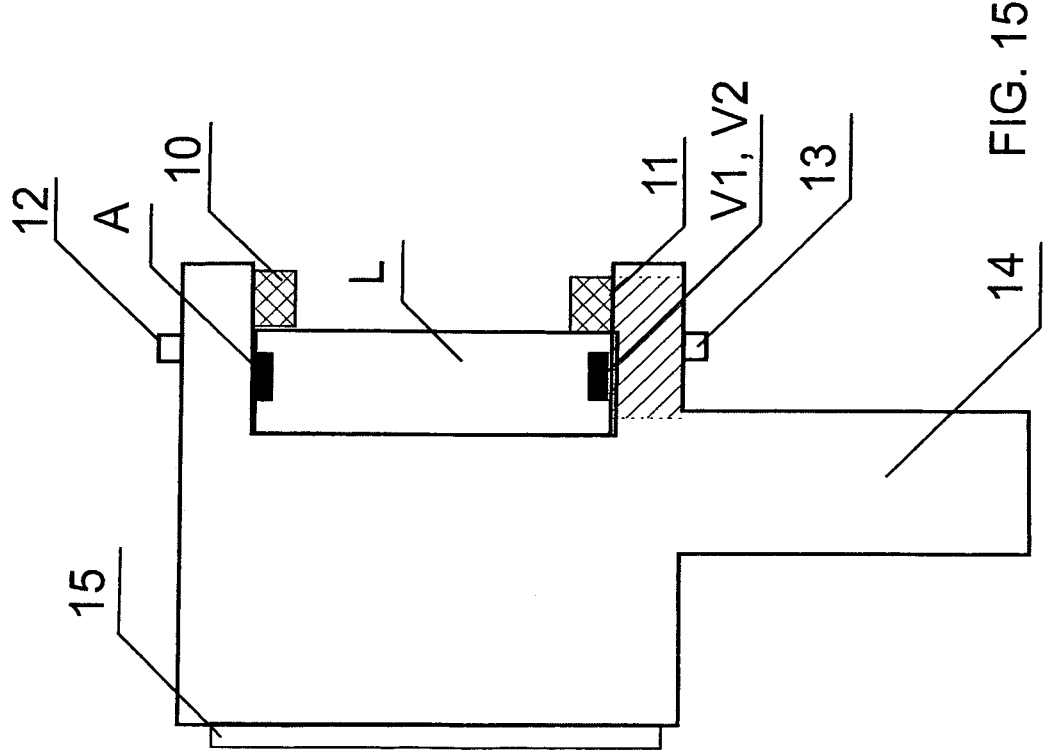
FIG. 15 is a side view of an apparatus comprising a housing with releasable fixing elements and a conduit after insertion.

FIGS. 15 and 16 illustrate an embodiment of the apparatus with a housing comprising pins 10, 11 movable in axial direction for receiving and holding the conduit L with the conduit held in the housing (FIG. 15) and with the conduit before insertion of after removal (FIG. 16). The active elements, comprising a transducer configured to be used as a transmitter A and two transducers configured to be used as receivers V1 and V2, are received in and held by a recess in two elongated arms of the housing. The pins can be actuated between an open and a closed position by buttons 12 and 13. The apparatus further comprises a handle 14 and an LCD display 15 for showing measurement results in alphanumeric and graphical form. The mechanical fixing elements of the housing provide for a quick and easy replacement of the conduit. In the above examples the transducers were fixed to a part of the housing in a permanent way, however it is also possible to connect the transducers to the conduit as will be shown below.

Figure 17A:
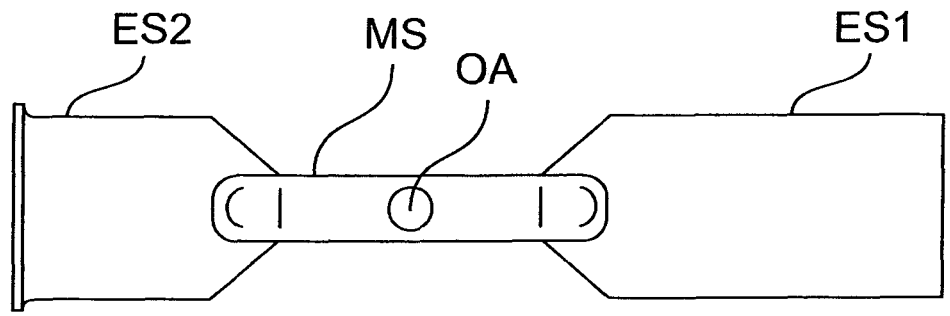
FIG. 17A-C are side and cross sectional views of an embodiment of the conduit for use in a special embodiment of the apparatus.
Figure 17B:
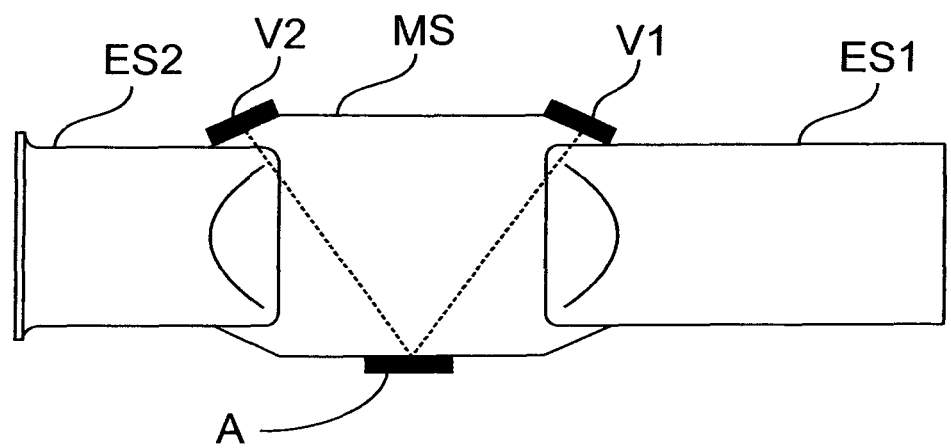

In medical applications of the apparatus such as a spirometer, the conduit is a short pipe that is open at both ends to let air through in both directions. FIGS. 17A to 17C show an exemplary embodiment of the conduit for use in a spirometer comprising end sections ES1, ES2 with substantially circular cross section and a middle section MS or measuring area with a flattened substantially rectangular cross section in different views. In practice, the flow is generated from one end ES1 of the tube only, in both directions, therefore the other end ES2 of the tube is slightly cone-shaped to reduce turbulences when the flow is aspirated from the first end ES1. FIG. 17A shows the tube in a side view from the narrow side of the flattened middle section MS. In the middle region of the middle section MS a transmitting area OA is formed for receiving a transducer used as a transmitter. In FIG. 17B the pipe is shown in a side view from the wide side of the flattened middle section MS with a transmitter A and two receivers V1 and V2. The receivers V1 and V2 are positioned on the narrow side of the middle section opposite to the transmitter A in a border region near to the end sections ES1 and ES2. Due to this location the receivers are directed towards the transmitter which allows receiving the transmitted waves with a higher efficiency. The distant location of the receivers from the transmitter provides for a higher resolution and therefore a higher accuracy of the measurement. FIG. 17C shows the pipe is a side view like FIG. 17B does but in cross section. As it can be seen, there is an opening OA for receiving a transmitter on a narrow side in the middle region of the middle section MS and there are two other transmitting areas OV1 and OV2 for receiving receivers on the opposite narrow side in the border region of the middle section MS. The transmitter may be a unifocal transmitter with a wide radiation angle or a bifocal transmitter with two narrow radiation angles directed and focused on the receivers V1 and V2 as described above in more detail.

Figure 17:
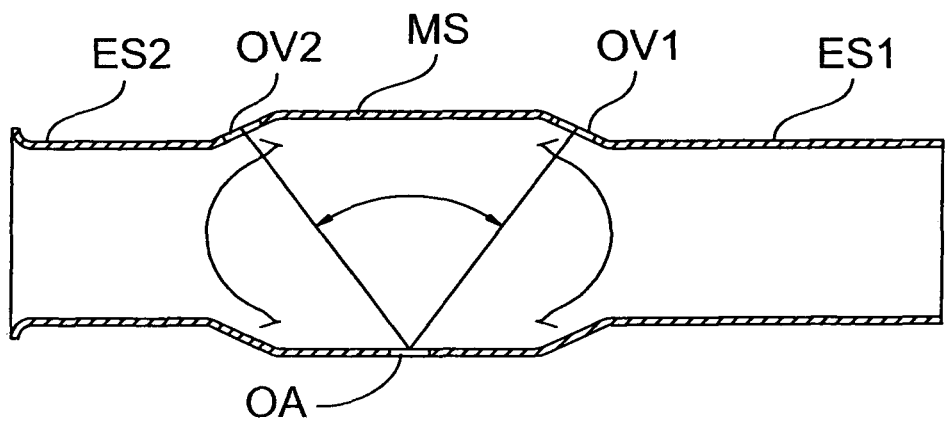
Figure 18A:
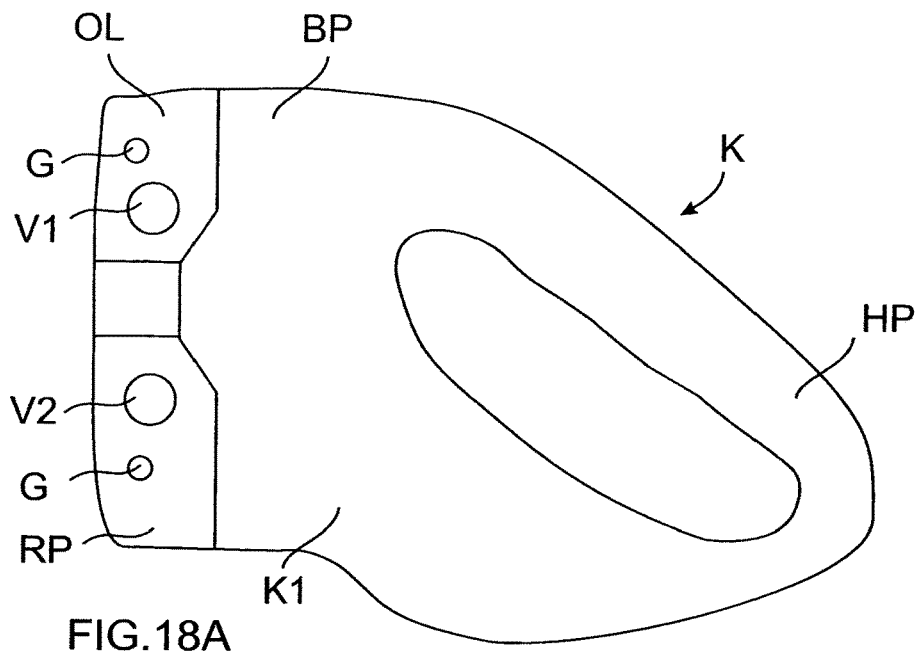
FIG. 18A-C is a side view of the two parts of the housing of a special embodiment of the apparatus, partly in cross section.
Figure 18B:
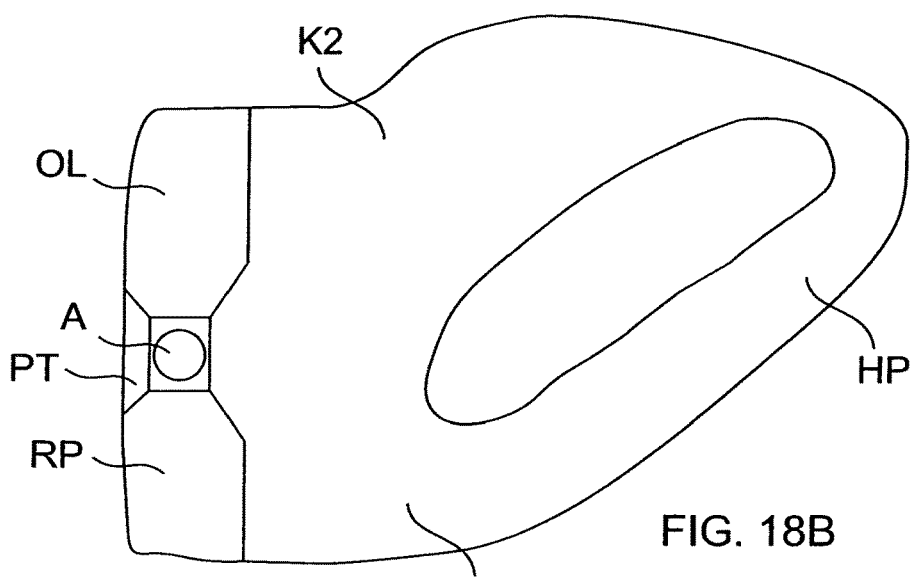
Figure 18C:
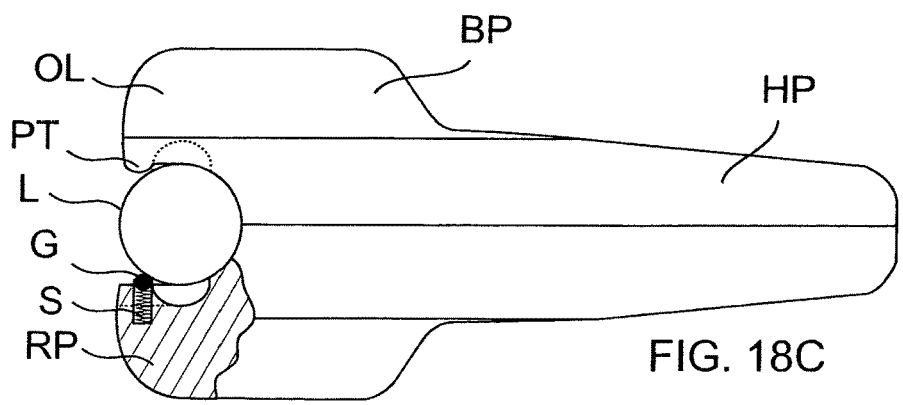

FIGS. 18A to 18C show a further exemplary embodiment of a handheld form of the apparatus for medical purposes such as a spirometer, comprising a housing K of two parts K1, K2 for receiving the conduit L in a releasable way. The housing further encloses the control unit and the transducers being connected to the control circuit. Two of the transducers configured to be used as receivers V1, V2 are received and held in one part K1 of the housing and one of the transducers configured to be used as transmitter A is received and held in the other part K2 of the housing facing the first part when assembled. A display device (not shown) may also be incorporated on the outer surface of one part of the housing in order to provide instant visible information of the measuring results. The housing when assembled comprises a handle portion HP for holding by the patient, a body portion BP for receiving the control means and a head portion RP for receiving the conduit L. In order to provide for a fast and easy removal and replacement of the conduit shown in FIGS. 17A to 17C the two parts K1, K2 of the housing comprise an opening OL for receiving the conduit L in the head portion RP. This opening has an open end of substantially the same size as the diameter of the end sections of the conduit shown in FIG. 17. One part K2 of the housing comprises in the head portion RP a protrusion PT covering a wider middle section of the conduit in the measuring area. The other part K1 of the housing may be provided with an open portion for receiving the middle section of the conduit in the measuring area and at least one resilient fixing element for holding the conduit in a predefined measuring position. Such a resilient fixing element may comprise a spring S activated ball G as shown in the drawing.

Figure 19:
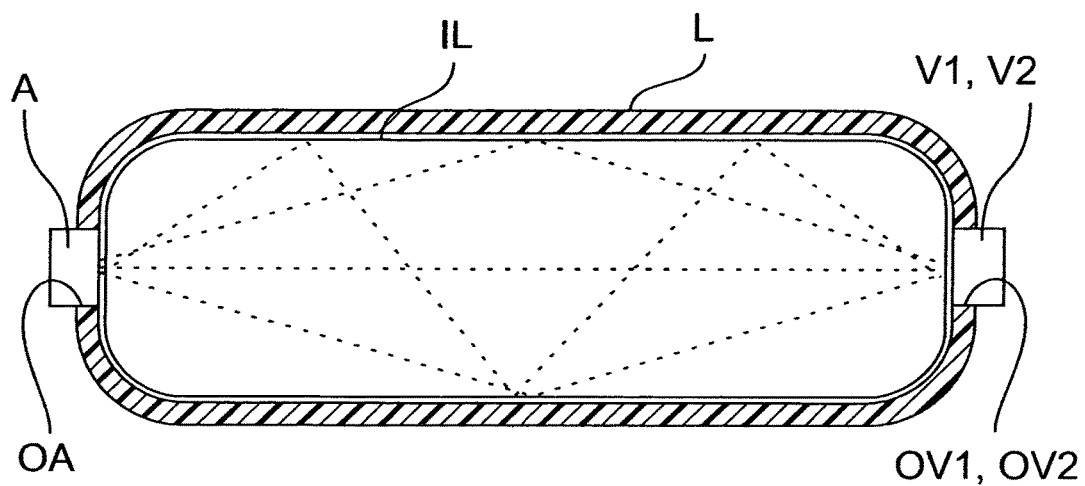
FIG. 19 is a cross sectional view of the conduit shown in FIG. 17 with transducers and a protective layer.

FIG. 19 illustrates the middle section of the tube shown FIGS. 17A to 17C. in the cross-section. In this exemplary embodiment the conduit has transmitting areas OA, OV1 and OV2 for receiving a transmitter A and two receivers V1 and V2. In order to provide a homogenous inner surface that can be effectively sterilized, the inner surface is covered with a layer. The thickness of the layer is selected so that the ultrasonic waves can propagate through it with minimal loss. The material of the layer is selected to be bio-compatible for human contact. For this purpose PE or PTFE may be used as a material of this layer. The transducers are in physical contact with the inner layer so that the ultrasonic waves have to cross only one surface. When used in a spirometer the conduit as shown in FIGS. 17 and 19 has a preferred working position with the transducers being in a substantially horizontal plane. In such a case the condense water drops caused by the exhaled air with a greater humidity content will be deposited on the lower substantially horizontal inner surface and therefore not disturb the wave propagation and the measurement. The waves reflected by the side walls of the conduit L are shown with dotted lines.

Figure 20:
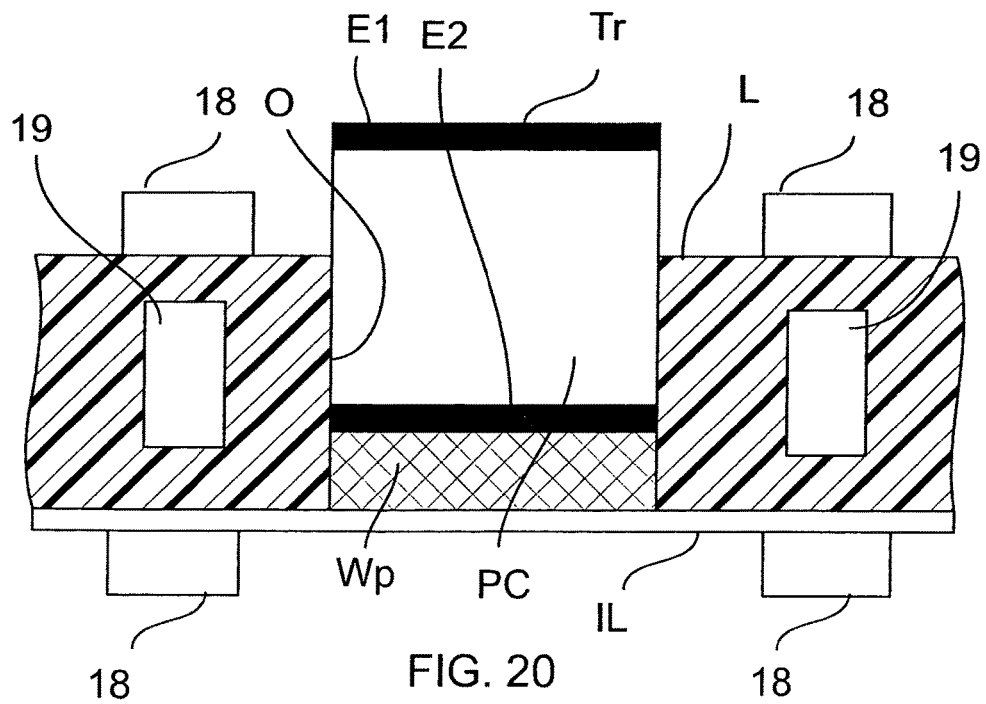
FIG. 20 is an enlarged view of the conduit wall with a transducer and wave propagation inhibiting elements.

In FIG. 20, a section of an embodiment of the conduit with a transducer and with wave propagation elements can be seen in a cross sectional view. The transducer Tr that may be a transmitter or a receiver is received in a recess or opening O which may be an open end hole similar to the embodiment shown in FIG. 19. Other possible examples of the transmitting area for receiving the transducers are described in more detail in connection with FIG. 1. The inside surface of the conduit L is covered with a layer IL, preferably of PTFE with a very small thickness. The disturbing effect of the shear waves is reduced or eliminated by protrusions 18 on the outer and inner surface of the conduit L in the vicinity of the transducer Tr on both sides. The transducer comprises a piezo crystal PC between two electrodes E1 and E2. One of the electrodes is connected to a wear plate WP which is directed towards the inner surface of the conduit. The transversal waves propagating inside the wall of the conduit L are blocked by holes 19 formed inside the wall of the conduit in the vicinity of the transducer Tr on both sides. In this embodiment the inner layer IL and wear plate WP are selected or dimensioned to have an overall thickness of $\lambda/4$. Alternatively it also possible to select the thickness of the wear plate in the range of $\lambda/4$ and to use a very thin inner layer that is able to oscillate with the wear plate.

What is claimed is:

1. A method for determining the flow parameters of a streaming gas in a conduit for medical applications, the method comprising the steps of:
    generating longitudinal waves inside the conduit with a transducer,
    transmitting said longitudinal waves in two different cross directions relative to the streaming direction (upstream and downstream direction) through the conduit,
    receiving said waves with transducers,
    determining transit time values of the waves between the transducer used as a transmitter and the transducers used as receivers,
    generating a difference value on the basis of the determined transit time values, and
    determining the flow parameters of the streaming gas on the basis of said difference value,
    wherein the method further includes the steps of:
    determining a first pair of transit time values of the waves between the transducer used as a transmitter and the transducers used as receivers,
    determining an approximate flow rate of the streaming gas on the basis of a difference between the first pair of transit time values and the transit times corresponding to a zero flow rate,
    determining a time shift value necessary for the streaming gas to propagate from a first wave transmission path to a second wave transmission path,
    determining a second pair of transit time values of the waves between the transducer used as a transmitter and the transducers used as receivers with a delay between the upstream and downstream transmission path transit time measurements, the delay being determined by said time shift value, and
    determining a more accurate flow rate of the streaming gas on the basis of a difference between the second pair of transit time values.

2. The method of claim 1, wherein the transit times are determined by
    determining transit times between the transducer used as a transmitter and the transducers used as receivers under normal conditions when the flow rate is zero,
    measuring a phase shift of the zero crossing of a corresponding rising edge of the received signal,
    calculating a time difference corresponding to said phase shifting, and
    adding the time difference to the transit time under zero flow condition.

3. The method of claim 1, wherein the longitudinal waves generated by the transducer used as a transmitter are in the form of wave packages separated from each other by a period sufficiently long for identifying the appropriate pulse packages and the transit times are determined by measuring the time between a selected point of the transmitted wave package and a corresponding point of the same received wave package.

4. The method of claim 3, wherein subsequent wave packages following each other are shifted in phase with respect to each other wherein the phase shift is selected randomly between a minimum and a maximum value, for inhibiting the forming of standing waves inside the conduit.

5. The method of claim 1, wherein a zero crossing is used for determining the transit time values after the amplitude of the received signal has exceeded a predetermined comparator level when the zero crossing is inside a time window determined by minimum and maximum streaming conditions.

6. The method of claim 1, wherein the transit times between the transducer used as a transmitter and the transducers used as receivers are determined under zero flow condition wherein the transducers used as receivers are located symmetrically relative to the transducer used as a transmitter and if a difference between the two transit times is detected, an offset value is determined and all subsequent measured values are corrected on the basis of the offset value.

7. The method of claim 1, wherein the transit times between the transducer used as a transmitter and the transducers used as receivers are determined under zero flow condition, wherein the transducers used as receivers are located asymmetrically relative to the transducer used as a transmitter and if a difference between a calculated or nominal position and an actual position of the transducer used as a transmitter can be detected, a correction value is determined and all subsequent measured values are modified with the correction value.

8. The method of claim 1, wherein the flow rate value of the streaming gas in a low flow rate range is corrected by a predetermined value selected on the basis of an analysis of a selected package of the received waves.

* * * * *

UNITED STATES PATENT AND TRADEMARK OFFICE
CERTIFICATE OF CORRECTION

PATENT NO. : 10,031,011 B2
APPLICATION NO. : 12/531105
DATED : July 24, 2018
INVENTOR(S) : Gyorgy Ferencz et al.

Page 1 of 1

It is certified that error appears in the above-identified patent and that said Letters Patent is hereby corrected as shown below:

On the Title Page

Item (30) Foreign Application Priority Data, delete "0700785" and insert --P0700785--.

Signed and Sealed this
Second Day of October, 2018

Andrei Iancu
*Director of the United States Patent and Trademark Office*